Feb. 7, 1933.        D. M. CLARK        1,896,134
LIQUID DISPENSING APPARATUS
Original Filed Feb. 25, 1929    3 Sheets-Sheet 1
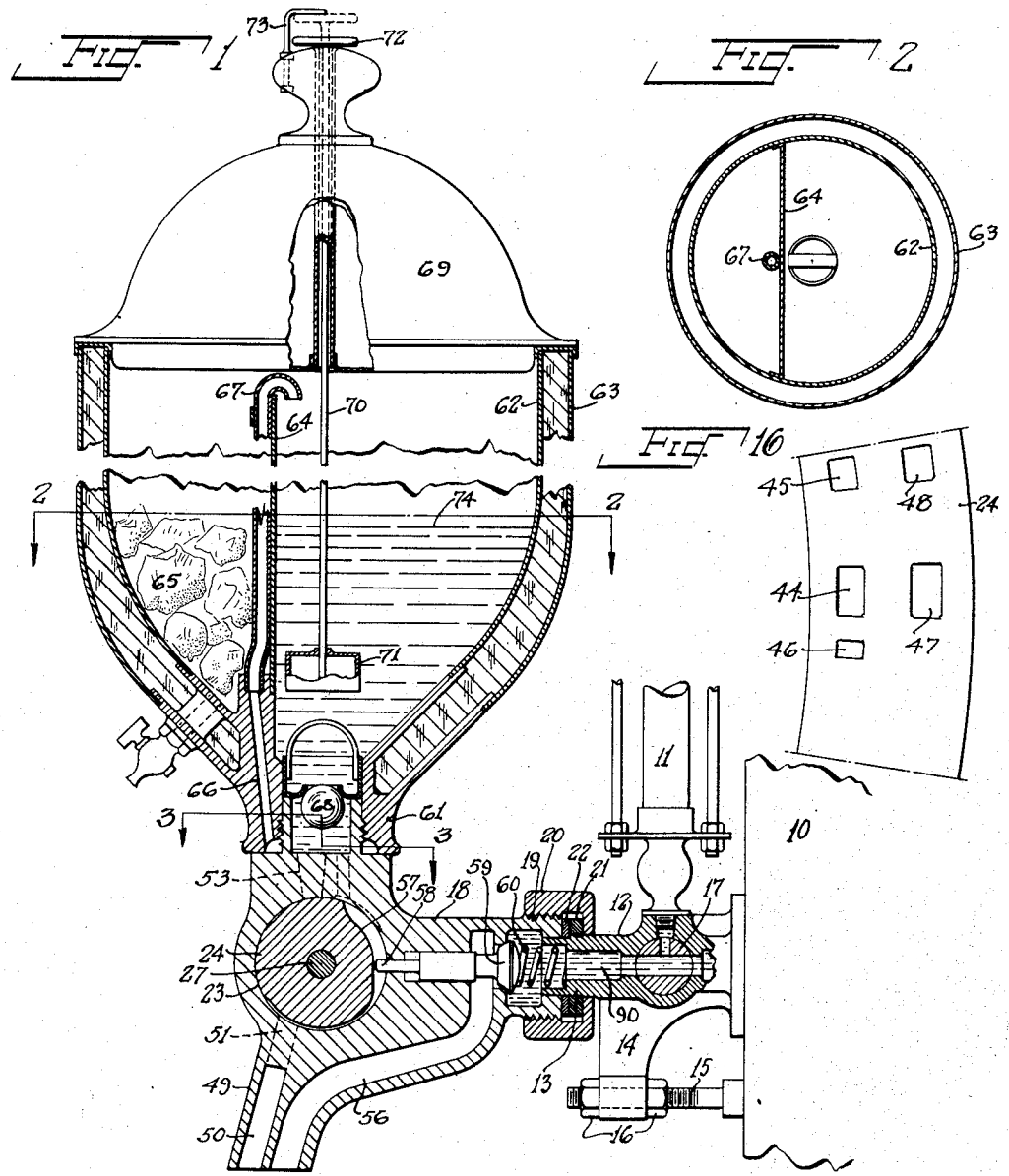
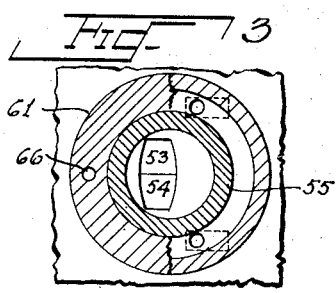
INVENTOR
D. M. Clark
BY C. B. Birkenbeuel,
ATTORNEY

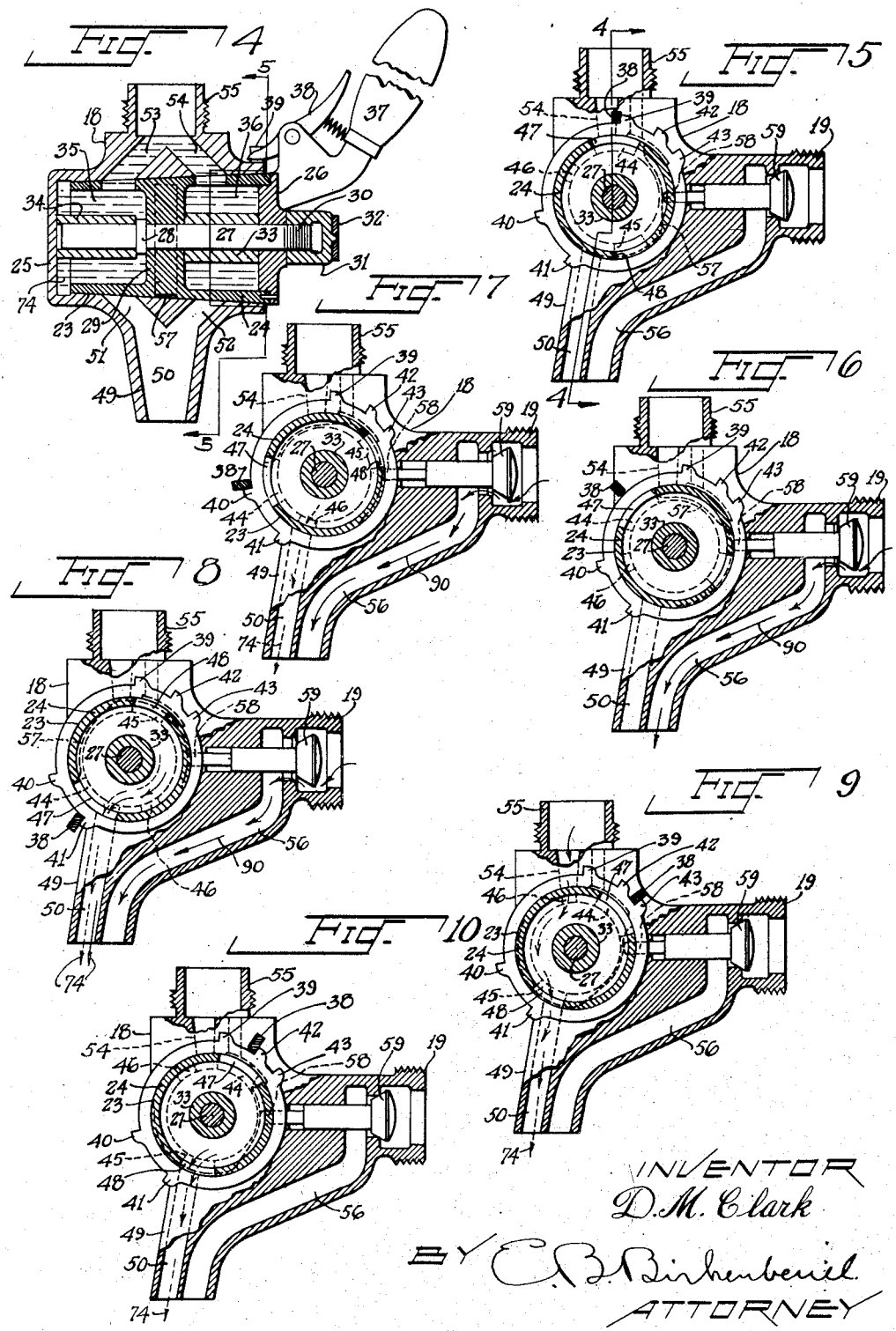

Feb. 7, 1933.        D. M. CLARK        1,896,134
LIQUID DISPENSING APPARATUS
Original Filed Feb. 25, 1929    3 Sheets-Sheet 3
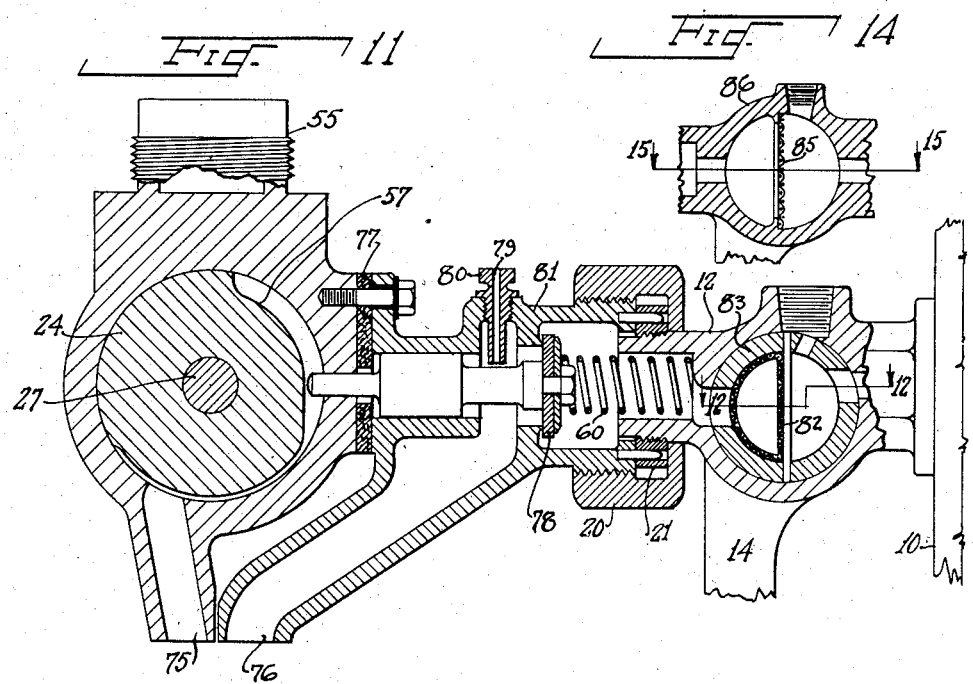
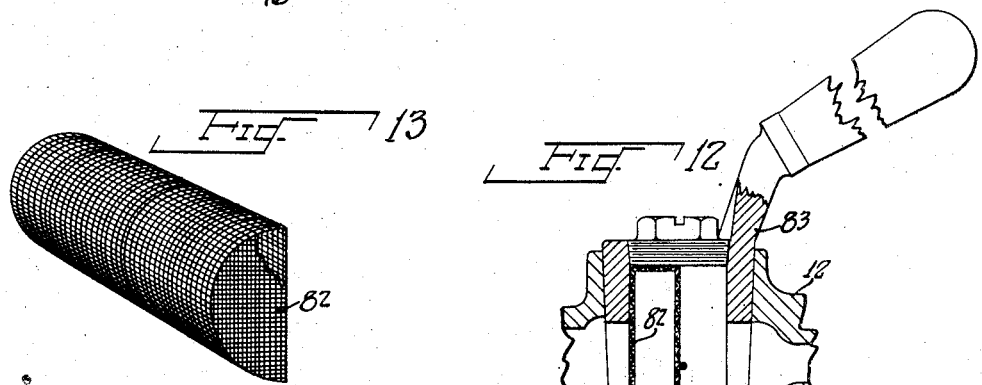
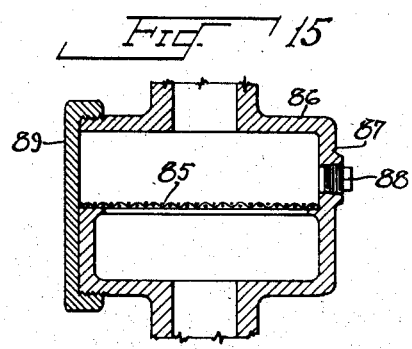
INVENTOR
D. M. Clark
BY
ATTORNEY Patented Feb. 7, 1933

1,896,134

UNITED STATES PATENT OFFICE

DOLPH M. CLARK, OF PORTLAND, OREGON

LIQUID DISPENSING APPARATUS

Application filed February 25, 1929, Serial No. 342,382. Renewed May 27, 1932.

This invention relates generally to liquid dispensing apparatus, and particularly to devices for dispensing cream and coffee and similar beverages.

The main object of this invention is to make it possible to easily and quickly dispense measured amounts of cream with coffee.

The second object is to make it possible to easily dispense measured or unlimited quantities of cream without coffee.

The third object is to provide a special form of covered cream container.

The fourth object is to provide a special form of ice compartment which is integral with the urn.

The fifth object is to prevent the flow of heat from the coffee dispensing section to the cream dispensing section.

The sixth object is to construct a special form of dispensing valve having an auxiliary means for operating one or more other valves.

The seventh object is to provide an air vent in the valve mechanism to prevent the drip of liquids therefrom after the valve is closed.

The eighth object is the employment of a check valve in the bottom of the cream container to prevent the circulation of heat therein.

These, and other objects will become more apparent from the specification following as illustrated in the accompanying drawings, in which:

Figure 1 is a vertical section through the device. Figure 2 is a horizontal section taken along the line 2—2 in Figure 1. Figure 3 is a horizontal section taken along the line 3—3 in Figure 1. Figure 4 is a longitudinal section through the cream measuring valve showing same in a closed position and taken along the line 4—4 in Figure 5. Figure 5 is a broken section taken along the line 5—5 in Figure 4 also showing the cream and coffee valves in closed positions. Figure 6 is a view similar to Figure 5 showing a "coffee only" position. Figure 7 is similar to Figure 5 but showing the delivery of measured cream and unmeasured coffee. Figure 8 is similar to Figure 5 but showing the parts in position for half cream and half coffee. Figure 9 is similar to Figure 5 but showing a continuous flow of cream. Figure 10 is similar to Figure 5 but showing "measured cream only". Figure 11 is a longitudinal section through a modified form of the device. Figure 12 is a vertical section taken along the line 12—12 in Figure 11. Figure 13 is a perspective view of the screen employed in the coffee valve. Figure 14 is a section through a modified form of strainer. Figure 15 is a section taken along the line 15—15 in Figure 14. Figure 16 is a development of the valve plug surface.

Similar numbers of reference refer to similar parts throughout the several views.

Referring in detail to the drawings, there is shown a portion of a coffee urn 10 having the usual gauge glass 11 and outlet fitting 12 provided with a threaded nipple 13. The fitting 12 is additionally supported by means of an arm 14 whose lower end is braced from the urn 10 by means of a screw 15 which is held in position by the lock nuts 16. The fitting 12 contains the usual coffee valve 17 by means of which the flow of coffee from the urn 10 is ordinarily controlled, but which in this instance is allowed to remain in a wide open position. Also the usual coffee faucet is dispensed with.

Referring now to my device, which is in reality a combined coffee and cream faucet, it will be seen to consist mainly of a body 18 having a threaded shank 19 and union 20 for attaching same to the nipple 13. An internal nut 21 and washer 22 are also employed to make this connection, although it is obvious that a flanged fitting may be employed to an equal advantage.

In the body 18 is formed a horizontal cylindrical valve seat 23 preferably tapering slightly to receive a correspondingly tapered plug 24. The small end 25 of the body 18 is closed and the large end of the plug 24 is provided with a cap 26, through which passes an operating stem 27 whose shoulder 28 bears against the central wall 29 of the plug 24, and whose threaded end 30 receives the lock nut 31 against whose end bears the spring 32 whose sole function is to hold the plug 24 to its seat. On the stem 27 have been placed the sleeves 33 and 34 which are of a diameter sufficient to provide the desired cubical capacity for the measuring compartments 35 and 36.

On the exterior of the body 18 is formed a plurality of stop lugs which determine the position of the operating lever 37 which is made integral with the cap 26, which lever carries a spring-urged pawl 38 which is normally in a lug-engaging position, but can be withdrawn therefrom by the pressure of a finger on the pawl 38.

The lugs are as follows: The lug 39 represents a closed position of the valve in which neither coffee nor cream is served. The lug 40 indicates the position for creamed coffee, that is to say, a measured quantity of cream is served with any quantity of coffee—for example, a cupful. The lug 41 indicates a position for half and half cream and coffee, in this instance the assumption being that a cup of coffee being served will be half cream. The lug 42 indicates a measured quantity of cream, as for instance might be served with cereal. The lug 43 indicates a position for a continuous flow of cream.

It will be noted that Figure 6 really constitutes a half position, or position for coffee only, but the passing through this position does not result in incorrect proportions of coffee and cream, inasmuch as the full quantity of cream is delivered almost instantly when the correct position is reached and before the full amount of coffee has been dispensed.

The plug 24 is provided with two groups of ports, namely the ports 44, 45, and 46 on one side of the central wall 29 and the ports 47 and 48 on the opposite side of the wall 29.

From the bottom of the body 18 extends the faucet mouth 49 containing a cream outlet 50 having the branching outlets 51 and 52 which connect with the groups of ports 44, 45 and 46 and the ports 47 and 48 respectively. Similar passageways 53 and 54 on the top side of the body 18 connect the ports 44 to 46 and 47 and 48 with the upwardly extending threaded nipple 55. From the faucet end 49 extends a passageway 56 for coffee, which passageway extends through the shank 19 where connection is made to the coffee urn.

In the outer surface of the plug 24 is formed a cam 57 near which is held the end 58 of a coffee valve 59, which is urged toward its seat by a spring 60 and is lifted therefrom by a rotation of the cam 57 through the operation of the lever 37.

On top of the nipple 55 is threaded the base 61 of a cream container 62 provided with an insulated jacket 63 and a dividing wall 64, on one side of which may be kept ice 65, or other cooling medium. An air passage 66 in the base 61 is connected by a vent tube 67 to the top side of the wall 64.

In the bottom of the container 62 is placed a ball check 68 adapted to prevent a circulation of cream between the measuring valve and the container 62, due to any rise in temperature which may occur within the measuring valve. A cover 69 is provided for the container 62 and in the cover is slidably mounted the vertical rod 70. On the lower end of the rod 70 is secured a float 71, and on the upper end of the rod 70 is secured a handle 72 which is held upward against the stop 73 by the action of the float 71, indicating the presence of sufficient cream within the container 62.

If it is desired to agitate the cream 74 within the container the stop 73 is merely swung to one side and the rod 70 reciprocated by means of the handle 72.

In the form of the device shown in Figure 11 the cream faucet 75 is separated from the coffee faucet 76 by means of a gasket 77 of insulating material. In this form of the device there is also illustrated a slightly different form of valve 78, and also an air hole 79 formed within a bushing 80 on the top side of the body 81. In this form of the device there is also shown a strainer 82 for the coffee valve 83, which strainer is semi-cylindrical in form (as shown in Figure 13), its function being to keep the coffee grounds out of the valve mechanism, as well as out of the beverage.

In Figures 14 and 15 is illustrated a modified form of screen in which a flat screen 85 is mounted across the center of a cylindrical container 86 whose closed end 87 is provided with a cleanout plug 88 for grounds, and whose opposite end is provided with a threaded cap 89.

The operation of the device is as follows: I will assume that there is a supply of coffee 90 in the urn 10 and cream 74 within the container 62, and also that the pawl 38 is in contact with the lug 39—in other words, the valve is in a closed position. I will now assume that it is desired to draw coffee only. The lever 37 is moved to the position shown in Figure 6 in which the pawl 38 is about midway between the lugs 39 and 40. In this position the cam 57 raises the coffee valve 59 from its seat allowing the coffee to flow from the faucet 56.

If, for example, it is desired to draw a cup of coffee with a definite or measured quantity of cream mixed with same, the lever 37 is moved to the position shown by the pawl 38 in Figure 7, that is, against the lug 40, which permits the cream in the compartment 35 to escape through the port 46 during the time sufficient coffee is flowing from the faucet 56 to fill the cup.

If, on the other hand, it is desired to draw half and half cream and coffee a movement of the lever 37 to the position shown in Figure 8, namely with the pawl 38 against the stop 41, then the contents of the compartments 35 and 36 will both be allowed to flow into the cup during the time that sufficient coffee is flowing to finish filling the cup.

It will be noted that in the movements thus far described that cream and coffee are supplied in each instance and no error can occur, due to the passage of the lever 37 from one position to another. However, if I start again at the shut-off position and wish to draw a measured quantity of cream only, as for cereal, it is only necessary to move the lever 37 to the position shown in Figure 10 wherein the coffee valve is closed and the compartment 36 delivers cream only.

If a continuous flow of cream is desired a further movement of the lever 37 to the position shown in Figure 9 (namely against the lug 43) whereby the coffee valve is closed and there is a direct connection between the cream container and the cream outlet 50.

It is clear that should any multiple of a measured quantity of cream be desired it can be secured by a repeated operation of the lever 37.

I claim:

1. A device for selectively combining liquids in definite proportions consisting of a valve having a plurality of measuring compartments formed therein, means for permitting the release of liquids from the desired number of compartments, and a continuous flow cam actuated mechanism operated by said measuring means.

2. A device for selectively dispensing fixed proportions of liquids consisting of a continuous flow valve, a measuring valve, a cam between said continuous flow valve and measuring valve whereby a movement of said cam in one direction will cause the dispensing of liquids in the successive order of a measured quantity of cream and then a continuous flow of cream, and a movement of said cam in the opposite direction will permit in successive order a flow of coffee only, then creamed coffee, and then a more highly creamed coffee.

3. A cream and coffee valve for selectively dispensing cream and coffee in varying proportions and quantities consisting of a plug valve having a plurality of compartments formed in the plug thereof, ports formed in said plug and in the body of said valve whereby one position of said plug will permit said compartments to be filled with cream and other positions of said plug will permit one or more of said compartments to be emptied or to permit the cream to pass directly through said plug, a cam formed in said plug, a coffee valve associated with said plug valve having a lift valve therein for controlling the flow of coffee therethrough, said lift valve operatively engaging said cam, and stop means for said plug whereby it may be positioned in a manner to variously combine the proportions of cream and coffee dispensed by said valve.

4. The combination of a coffee valve having a filtering compartment adapted to prevent the passage of grounds through said valve, a cream measuring valve associated with said coffee valve and insulated therefrom to prevent the flow of heat from said coffee valve to said cream valve, and means for actuating said coffee valve from said cream valve.

5. A cream measuring valve having a coffee controlling cam incorporated therewith, measuring compartments formed in said valve provided with inlet and outlet ports, said inlet and outlet ports and said cam having a relation whereby the normal position of said cream valve completely prevents the flow of cream and coffee, and a movement of said cream valve in one direction permits the dispensing of a predetermined quantity of cream only, while a further movement in the same direction permits a continuous flow of cream, whereas a movement in an opposite direction from the point of beginning first permits a continuous flow of coffee only, while a further movement in the same last mentioned direction permits a flow of creamed coffee, and a still further movement in this direction further increases the proportion of cream dispensed with relation to the coffee dispensed.

DOLPH M. CLARK.